United States Patent [19]
Chen

[11] Patent Number: 5,899,017
[45] Date of Patent: May 4, 1999

[54] FISHING DEVICE

[76] Inventor: Jiunn-Liang Chen, No. 7 Lane 42, Jen-Shing Road, Tai-Ping Shiang, Taichung Hsien, Taiwan

[21] Appl. No.: 08/957,023

[22] Filed: Oct. 24, 1997

[30] Foreign Application Priority Data

Apr. 22, 1997 [TW] Taiwan ................................. 86206322

[51] Int. Cl.$^6$ ..................................................... A01K 69/06
[52] U.S. Cl. ............................................................. 43/100
[58] Field of Search ................................. 43/8, 100, 102, 43/103

[56] References Cited

U.S. PATENT DOCUMENTS

| | | | |
|---|---|---|---|
| 2,522,017 | 9/1950 | Bergman | 43/100 X |
| 3,754,348 | 8/1973 | Ramsey | 43/103 |
| 3,821,861 | 7/1974 | Jalbert | 43/100 X |
| 5,131,184 | 7/1992 | Harrison | 43/100 |

*Primary Examiner*—Robert P. Swiatek
*Attorney, Agent, or Firm*—Rosenberg, Klein & Bilker

[57] ABSTRACT

A fishing device includes a base having a receiving member and a guiding sleeve securely connected to the receiving member. The guiding sleeve includes a positioning section at a distal end thereof for mounting a net. A first gate is mounted between the receiving member and the guiding sleeve, the first gate being openable only in a direction which towards the guiding sleeve. A movable seat is mounted in the guiding sleeve and includes an opening defined therein. A second gate is mounted in the opening and openable only in a direction the same as that of the first gate. A cylinder includes an end connected to the positioning section, and a piston rod is partially, reciprocatingly received in the cylinder. The piston rod includes an end securely attached to the movable seat to move therewith. The piston rod together with the movable seat are urged to reciprocatingly move in a longitudinal direction of the guiding sleeve. Movements of the piston rod and the movable seat cause a suction force in the receiving member.

4 Claims, 5 Drawing Sheets

FISHING DEVICE

BACKGROUND OF THE INVENTION

1. Field of the Invention

The present invention relates to a fishing device which may effectively trap fish.

2. Description of the Related Art

A typical fishing method is to put a net into deep sea to catch fish. Nevertheless, such a method is prohibited now since the net is attached with sharp spikes or thorn-like members which may cause serious injury to coral and thus cause destruction to the environment. Another typical fishing method uses static devices for trapping fish which is time-consuming, ineffective, and uneconomic.

The present invention is intended to provide an improved fishing device which may effectively trap fish without destroying the environment.

SUMMARY OF THE INVENTION

The present invention provides a fishing device in water which comprises a base including a receiving member and a guiding sleeve securely connected to the receiving member. The guiding sleeve includes a positioning section at a distal end thereof for mounting a net. A first gate means is mounted between the receiving member and the guiding sleeve, the first gate means being openable only in a direction which towards the guiding sleeve.

A movable seat is mounted in the guiding sleeve and includes an opening defined therein. A second gate means is mounted in the opening and openable only in a direction the same as that of the first gate means. A cylinder means includes an end connected to the positioning section, and a piston rod is partially, reciprocatingly received in the cylinder means. The piston rod includes an end securely attached to the movable seat to move therewith.

Means for actuating the piston rod is provided to urge the piston rod together with the movable seat to reciprocatingly move in a longitudinal direction of the guiding sleeve. Movements of the piston rod and the movable seat cause a suction force in the receiving member.

The fishing device may further comprise a bait container provided in front of the receiving member. The actuating means may be an electric device which periodically actuates the piston rod. The fishing device may further comprise an infrared sensor mounted to the receiving member to detect if there is a school of fish in the receiving member.

Other objects, advantages, and novel features of the invention will become more apparent from the following detailed description when taken in conjunction with the accompanying drawings.

DESCRIPTION OF THE PREFERRED EMBODIMENT

Figure 1:
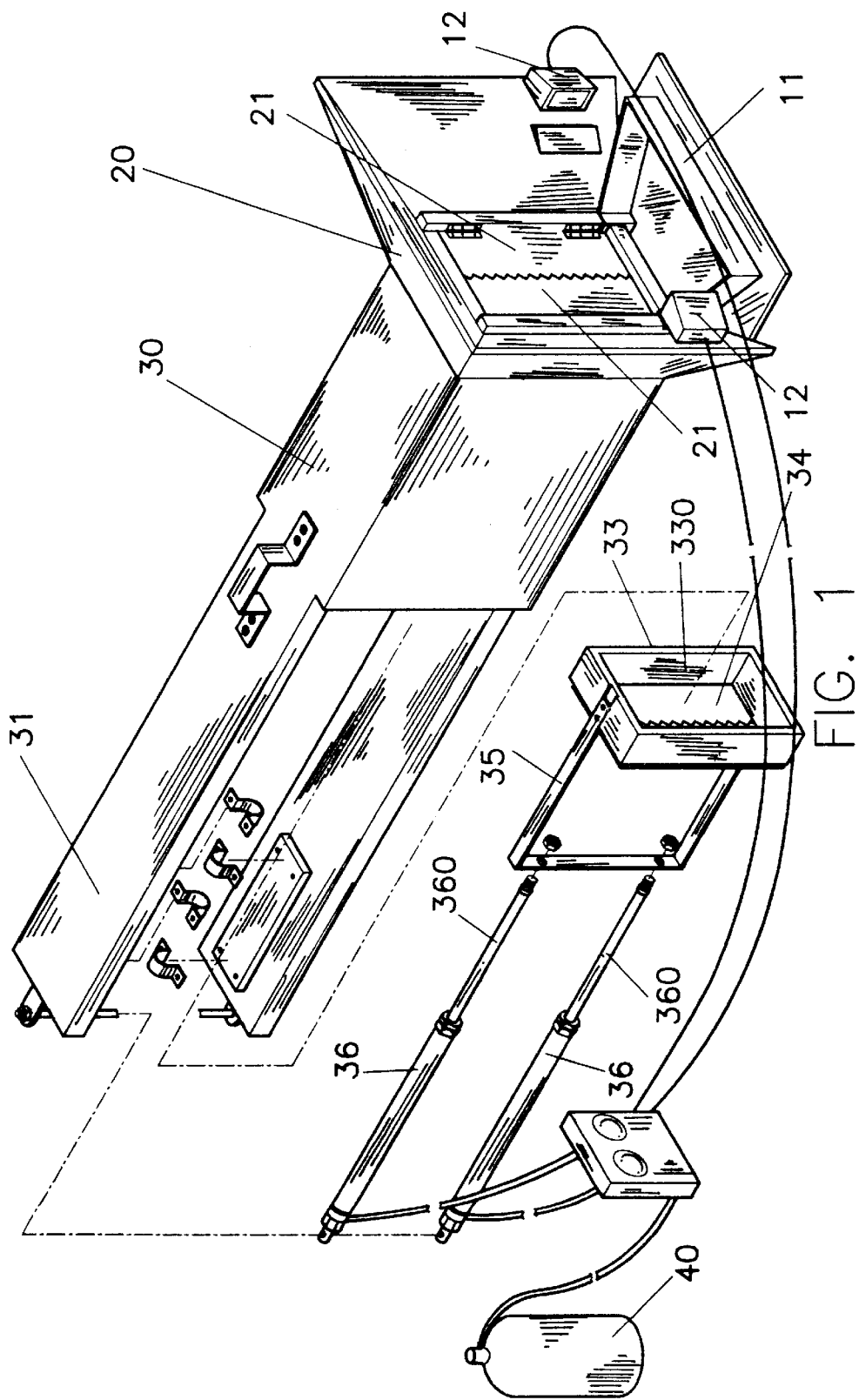
FIG. 1 is an exploded perspective view of a fishing device in accordance with the present invention.
Figure 2:
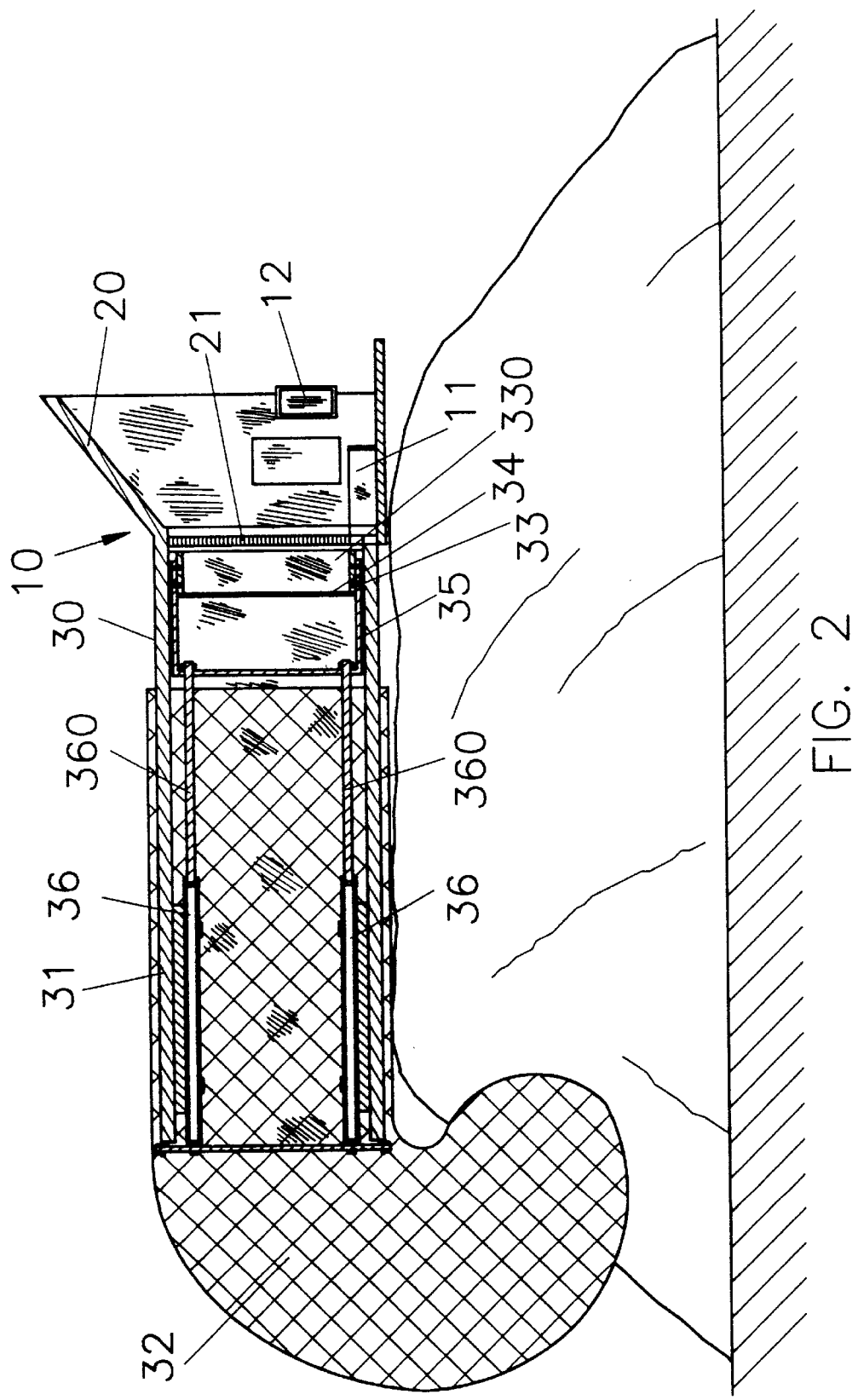
FIG. 2 is a cross sectional view of the fishing device.
Figure 3:
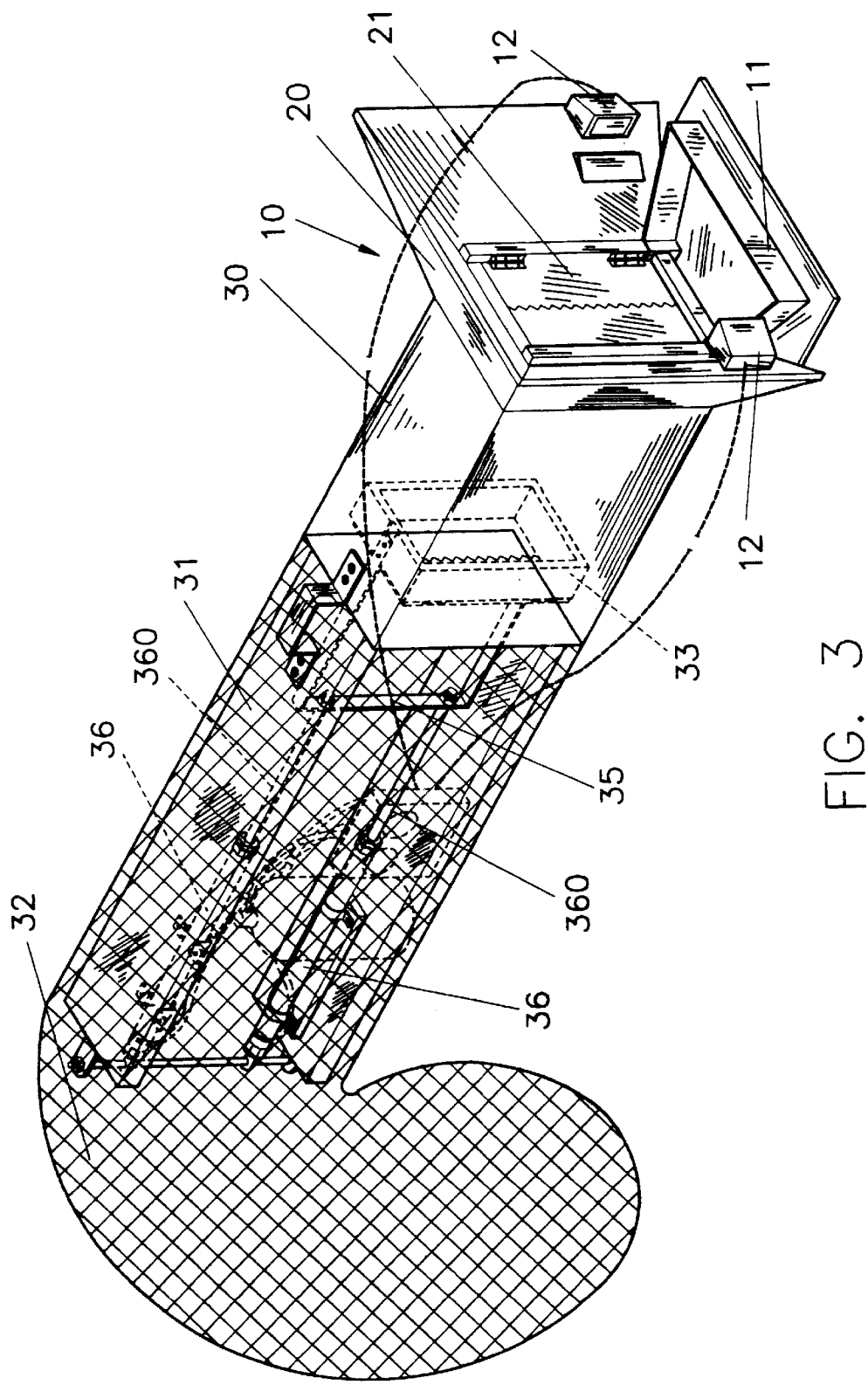
FIG. 3 is a perspective view of the fishing device.

Referring to FIGS. 1 to 3, a fishing device in accordance with the present invention generally includes a base 10 having a trumpet-like receiving member 20 and a guiding sleeve 30 securely connected to the receiving member 20. The guiding sleeve 30 includes a positioning section 31 at a distal end thereof for mounting a net 32 (FIG. 3). A first gate means 21 is mounted between the receiving member 20 and the guiding sleeve 30 in a manner that the first gate means 21 is openable only in a direction which towards the guiding sleeve 30.

A movable seat 33 is mounted in the guiding sleeve 30 and includes a second gate means 34 mounted in an opening 330 (FIG. 1) defined therein. The second gate means 34 is only openable in a direction the same as that of the first gate means 21. A positioning frame 35 is securely attached to the movable seat 33. A cylinder means 36 includes an end connected to the positioning section 31. In this embodiment, there are two cylinders 36 each including a piston rod 360 partially, reciprocatingly received therein. Each piston 360 includes an end securely attached to the movable seat 33 to move therewith. The piston rods 360 of the cylinders 36 may be actuated by a pump 40 (FIG. 1) to urge the movable seat 33 to move in a longitudinal direction of the guiding sleeve 30. The pump 40 may be remotely controlled by electric devices so as to be activated periodically. In addition, an infrared sensor 12 (FIG. 2) may be mounted to an inner wall of the receiving member 20 to sense if there is a school of fish entering the receiving member 20.

In assembly, referring to FIG. 2, the movable seat 33 is mounted in the guiding sleeve 30, and an end of each cylinder 36 is pivotally connected to the positioning section 31 of the base 10, while each piston rod 360 is securely connected to the positioning frame 35 to move therewith. A net 32 is attached to the positioning section 31, and a bait container 11 is provided in front of the receiving member 20.

Figure 4:
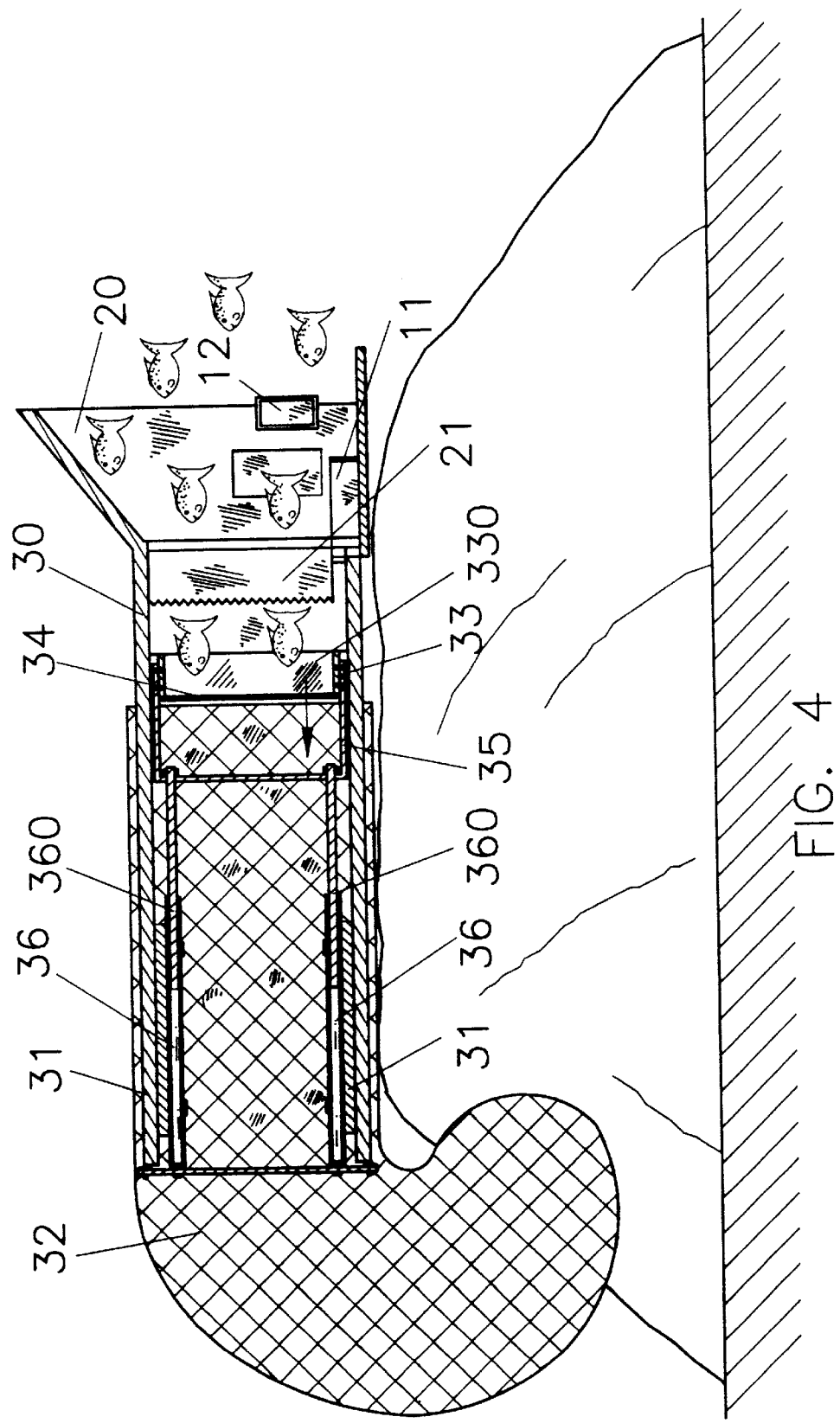
FIGS. 4 and 5 are cross sectional views illustrating operation of the fishing device.
Figure 5:
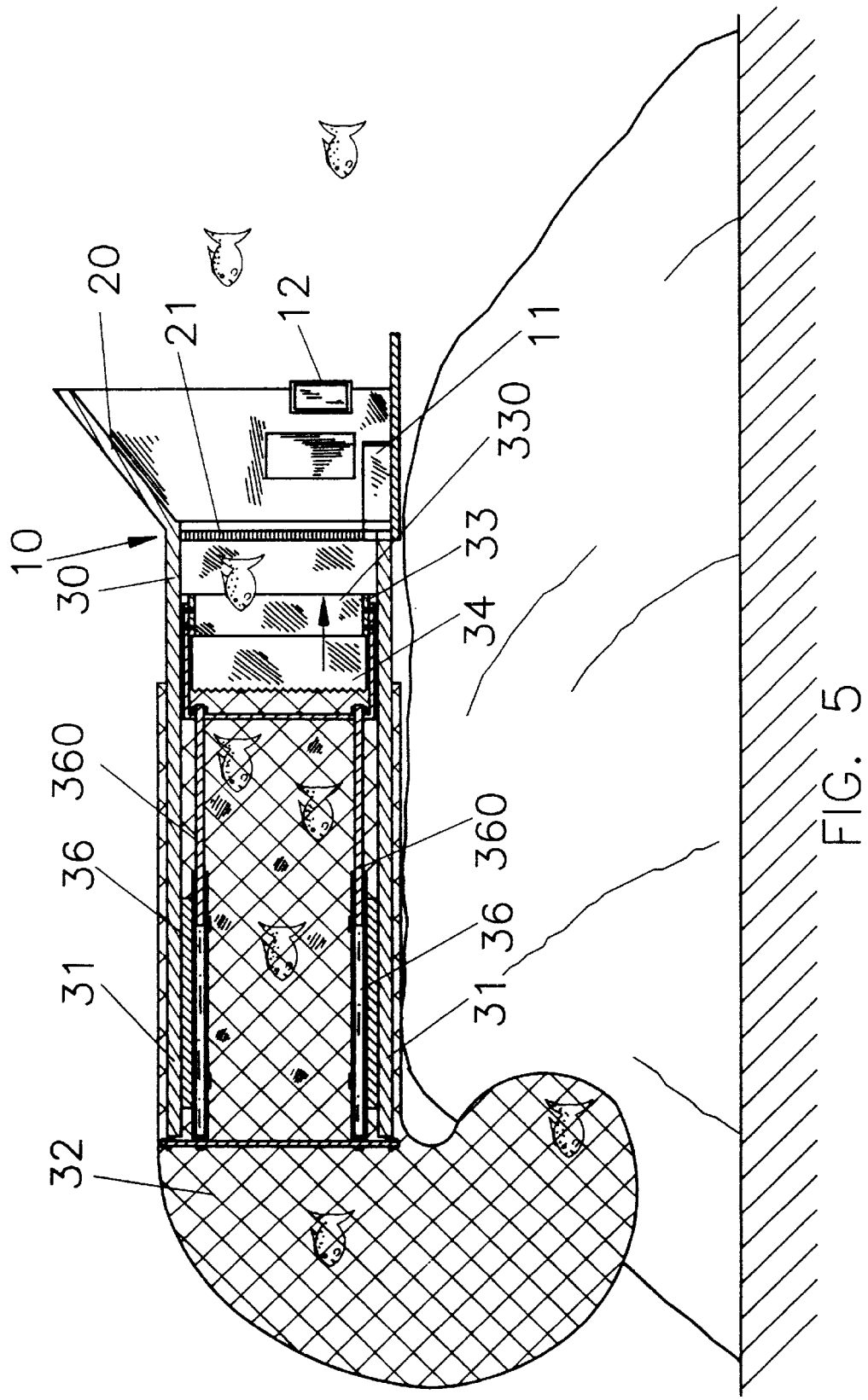

In use, referring to FIGS. 2 and 4, when the infrared sensor 12 detects there is a school of fish entering the receiving member 20, the pump 40 (FIG. 1) is activated such that the piston rods 360 together with the movable seat 33 move away from the receiving member 20 (FIG. 4). Due to reactive force exerted by water, the second gate means 34 is closed, yet the motion of the movable seat 33 causes a suction force which actuates the first gate means 21 to open toward the guiding sleeve 30. The school of fish which is eating the bait in the bait container 12 is sucked into the guiding sleeve 30. Then, the piston rods 360 together with the movable seat 33 are moved toward the receiving member 20, which motion causes the first gate means 21 to close due to water pressure, while the second gate means 34 is opened due to a reactive force exerted by water such that the school of fish in the guiding sleeve 30 is sucked into the net 32 via the opening 330 of the movable seat 33. Accordingly, the fishing device of the present invention may effectively, efficiently catch fish.

Although the invention has been explained in relation to its preferred embodiment, it is to be understood that many other possible modifications and variations can be made without departing from the spirit and scope of the invention as hereinafter claimed.

What is claimed is:

1. A fishing device for use in water, comprising:

a base including a receiving member and a guiding sleeve securely connected to the receiving member, the guiding sleeve including a positioning section at a distal end thereof for mounting a net, a first gate means being mounted between the receiving member and the guiding sleeve, the first gate means being openable only in a direction which towards the guiding sleeve, a movable seat mounted in the guiding sleeve and including an opening defined therein, a second gate means being mounted in the opening and openable only in a direction the same as that of the first gate means, and a cylinder means including an end connected to the positioning section, a piston rod being partially, reciprocatingly received in the cylinder means and including an end securely attached to the movable seat to move therewith, and means for actuating the piston rod to urge the piston rod together with the movable seat to reciprocatingly move in a longitudinal direction of the guiding sleeve;

whereby movements of the piston rod and the movable seat cause a suction force in the receiving member.

2. The fishing device according to claim 1, further comprising a bait container provided in front of the receiving member.

3. The fishing device according to claim 1, wherein the actuating means is an electric device which periodically actuates the piston rod.

4. The fishing device according to claim 1, further comprising an infrared sensor mounted to the receiving member.

* * * * *